(12) United States Patent
Borkar et al.

(10) Patent No.: US 9,779,222 B2
(45) Date of Patent: Oct. 3, 2017

(54) SECURE MANAGEMENT OF HOST CONNECTIONS

(71) Applicant: Avaya Inc., Santa Clara, CA (US)

(72) Inventors: Vijaykumar V. Borkar, Pune (IN); Saurabh Sule, Pune (IN)

(73) Assignee: Extreme Networks, Inc., San Jose, CA (US)

( * ) Notice: Subject to any disclaimer, the term of this patent is extended or adjusted under 35 U.S.C. 154(b) by 169 days.

(21) Appl. No.: 14/750,305

(22) Filed: Jun. 25, 2015

(65) Prior Publication Data
US 2016/0378956 A1    Dec. 29, 2016

(51) Int. Cl.
H04L 29/06 (2006.01)
H04L 29/08 (2006.01)
G06F 21/10 (2013.01)

(52) U.S. Cl.
CPC .............. *G06F 21/10* (2013.01); *H04L 63/20* (2013.01); *H04L 67/06* (2013.01)

(58) Field of Classification Search
CPC . H04L 63/14; H04L 63/1408; H04L 63/1416; H04L 63/1425; H04L 63/142
See application file for complete search history.

(56) References Cited

U.S. PATENT DOCUMENTS

| | | | | |
|---|---|---|---|---|
| 7,466,654 B1* | 12/2008 | Reifer | ................. | H04L 63/1408 370/235 |
| 7,814,546 B1* | 10/2010 | Strayer | ............... | H04L 63/1416 726/23 |
| 7,854,003 B1* | 12/2010 | Strayer | ............... | H04L 63/1433 726/23 |
| 8,151,348 B1* | 4/2012 | Day | .................... | H04L 63/1408 709/224 |
| 2005/0144474 A1* | 6/2005 | Takala | .................. | H04L 63/083 726/27 |
| 2005/0157662 A1* | 7/2005 | Bingham | ............ | H04L 63/1425 370/254 |
| 2008/0059474 A1* | 3/2008 | Lim | ..................... | G06F 17/3089 |
| 2009/0154375 A1* | 6/2009 | Coskun | ................... | H04L 41/12 370/254 |
| 2012/0233699 A1* | 9/2012 | Jajodia | ................ | H04L 63/1433 726/25 |
| 2013/0191627 A1 | 7/2013 | Ylonen et al. | | |
| 2013/0191630 A1* | 7/2013 | Ylonen | ............... | H04L 63/1483 713/153 |
| 2013/0191631 A1 | 7/2013 | Ylonen et al. | | |

(Continued)

*Primary Examiner* — Khang Do
(74) *Attorney, Agent, or Firm* — Haley Guiliano LLP (57) ABSTRACT

An access gateway monitors a communication session to a first host for commands entered by a user. For example, commands entered in a command line terminal by the user. When a command is received, the access gateway receives information about an effect caused by the command on the first host. The access gateway determines if the effect results in an attempt to establish a communication session between the first host and a second host. For example, to copy files from the second host. In response to determining that the effect results in an attempt to establish a communication session between the first host and the second host, an action is generated. For example, the action may be to block the attempt to establish the communication between the first host and the second host.

20 Claims, 5 Drawing Sheets

(56) References Cited

U.S. PATENT DOCUMENTS

| | | | |
|---|---|---|---|
| 2015/0020199 A1* | 1/2015 | Neil | H04L 63/1433 726/23 |
| 2015/0030313 A1* | 1/2015 | Tammisalo | G11B 27/02 386/278 |
| 2016/0142334 A1* | 5/2016 | Alger | H04L 63/1466 709/225 |

* cited by examiner

SECURE MANAGEMENT OF HOST CONNECTIONS

TECHNICAL FIELD

The systems and methods disclosed herein relate to security management and in particular to secure management of host-to-host connections.

BACKGROUND

Logging into one host and then making a connection to another host (also known as host hopping) is a feature that is commonly used in today's networks. Products such as Linux™, allow a user to host hop using commands, such as ssh (Secure SHell), telnet, File Transfer Protocol (FTP), and secure copy. The use of host hopping allows an administrator the ability to manage hosts on the network.

However, host hopping may open up a network to security breaches. If a user who has rights on a first host uses host hopping to gain access to a second host that the user does not have rights to access, a security breach can occur. These types of breaches can cause the loss of secure information.

In an attempt to protect against host hopping, current systems have the ability to monitor a communication session at a firewall. An administrator or software can monitor commands that are sent by a remote user accessing a host through the firewall. This solution does provide some additional protection. However, a malicious user can still breach the security of a second host by using macros or other scripts that are not detected by the administrator or software.

SUMMARY

Systems and methods are provided to solve these and other problems and disadvantages of the prior art. An access gateway monitors a communication session to a first host for commands entered by a user. For example, commands entered in a command line terminal by the user. When a command is received, the access gateway receives information about an effect caused by the command on the first host. The access gateway determines if the effect results in an attempt to establish a communication session between the first host and a second host. For example, to copy files from the second host. In response to determining that the effect results in an attempt to establish a communication session between the first host and the second host, an action is generated. For example, the action may be to block the attempt to establish the communication between the first host and the second host.

DETAILED DESCRIPTION

Figure 1:
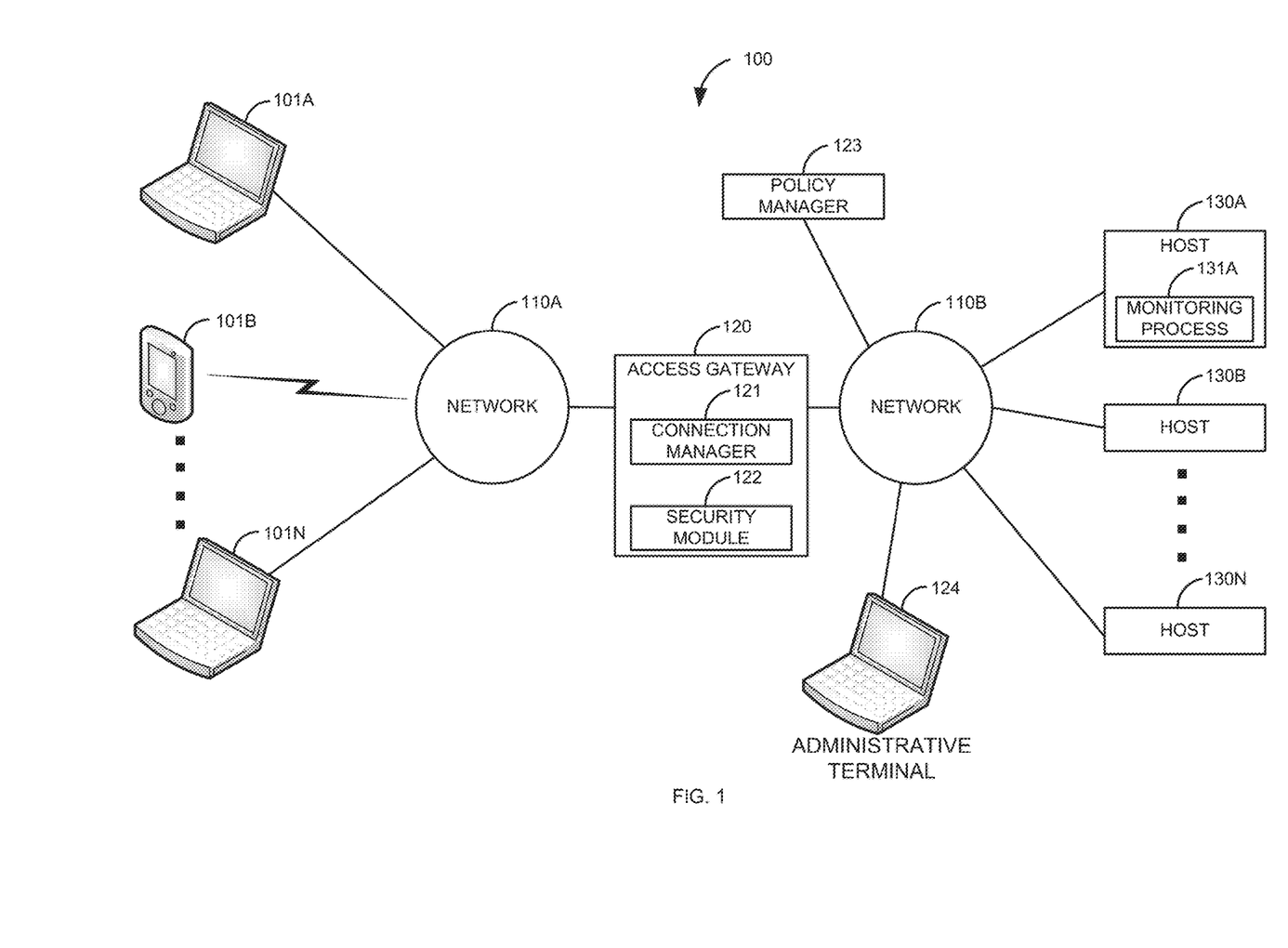
FIG. 1 is a block diagram of a first illustrative system for managing host hoping.

FIG. 1 is a block diagram of a first illustrative system 100 for managing host hoping. The first illustrative system 100 comprises communication devices 101A-101N, communications networks 110A-110B, an access gateway 120, a policy manager 123, an administrative terminal 124, and hosts 130A-130N.

The communication device 101 can be or may include any device that can communicate on the communication network 110A, such as a Personal Computer (PC), a telephone, a video system, a cellular telephone, a Personal Digital Assistant (PDA), a tablet device, a notebook device, and the like. As shown in FIG. 1, any number of communication devices 101A-101N may be connected to the communication network 110A, including only a single communication device 101. Although not shown, a communication device 101 may be connected to the communication network 110B.

The communication networks 110A-110B can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The communication networks 110A-110B can use a variety of electronic protocols, such as Ethernet, Internet Protocol (IP), Session Initiation Protocol (SIP), Integrated Services Digital Network (ISDN), and the like. Thus, the networks 110A-110B are electronic communication networks configured to carry messages via packets and/or circuit switched communications. In one embodiment, the communication network 110A is a public network, such as the Internet and the communication network 110B is a private network, such as an enterprise network.

The access gateway 120 can be or may include any hardware/software that can manage security between the networks 110A and 110B. For example, the access gateway 120 may be a session border controller, a firewall, a Network Address Translator (NAT), and/or the like. The access gateway 120 monitors communication sessions between the communication devices 101A-101N and the hosts 130A-130N.

The access gateway 120 further comprises a connection manager 121 and a security module 122. The connection manager 121 can be or may include any hardware/software that can manage communication sessions between the communication devices 101A-101N, the access gateway 120, and the hosts 130A-130N. The connection manager 121 may include hardware for routing communication sessions between the communication devices 101A-101N and the hosts 130A-130N. For example the connection manager 121 may be a Private Branch Exchange, a switch, a router, a session manager, and/or the like. The connection manager 121 is shown as part of the access gateway 120. However, in some embodiments, the connection manager 121 may be external to the access gateway 120.

The security module 122 can be or may include any hardware/software that can manage security. The security module 122 can monitor one or more communication sessions between the communication devices 101A-101N and the hosts 130A-130N. For example, the security module 122 can monitor a communication session between the communication device 101A and the host 130A while monitoring a communication session between the communication device 101B and the host 130B.

The policy manager 123 can be or may include any hardware/software that can provide polices for managing the access gateway 120. The policy manager 123 includes one or more rules for managing how communication sessions between the communication devices 101A-101N and the hosts 130A-130N are managed. In FIG. 1, the policy manager 123 is shown separate from the access gateway 120. However, in other embodiments, the policy manager 123 may be included in the access gateway 120.

The administrative terminal 124 may be any device that an administrator can use to view and control communication sessions between the communication devices 101A-101N and the hosts 130A-130N. The administrative terminal 124 may be a communication device 101.

The hosts 130A-130N can be any device that can that can accept commands, such as a server, a router, a Private Branch Exchange, a switch, a communication device 101, a file server, a media server, a communication device 101, and/or the like. The hosts 130A-130N will typically have an operating system, such as Linux™, Microsoft Windows®, Unix®, and/or the like that supports host hopping.

In FIG. 1, the host 130A also includes a monitoring process 131A. The monitoring process 131A can be or may include any process that monitors the host 130A for events. Although FIG. 1 only shows the host 130A as including a monitoring process 131A, depending on configuration, any of the hosts 130A-130N may or may not have a monitoring process 131A.

Figure 2:
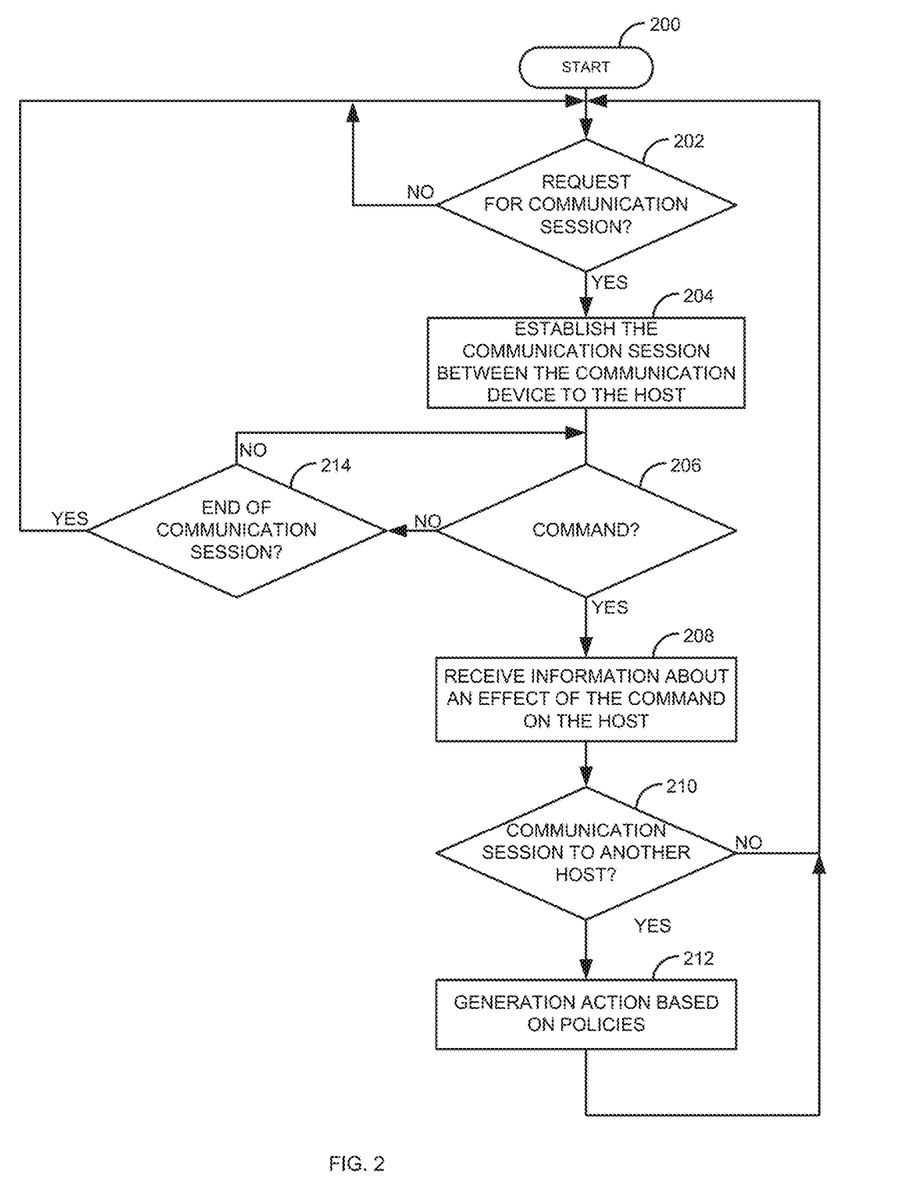
FIG. 2 is a flow diagram of a process for managing host hoping.
Figure 3:
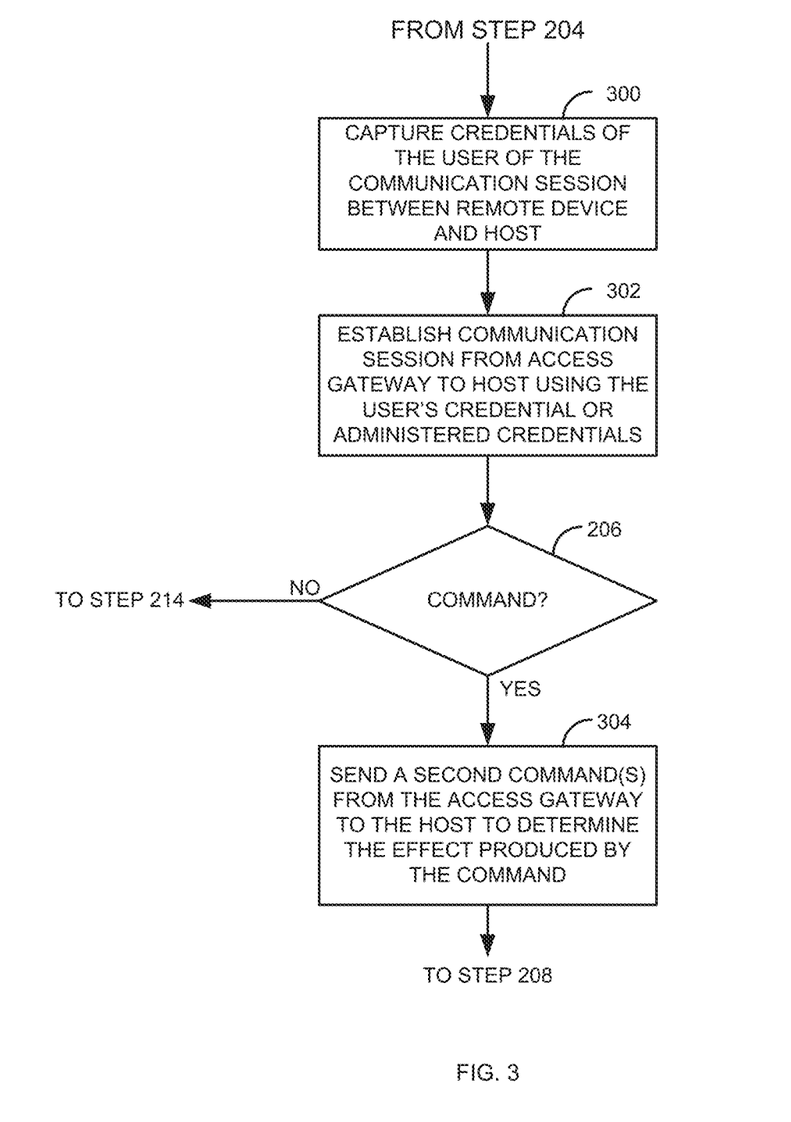
FIG. 3 is a flow diagram of a process for establishing a communication session between an access gateway and a host for managing host hopping.
Figure 4:
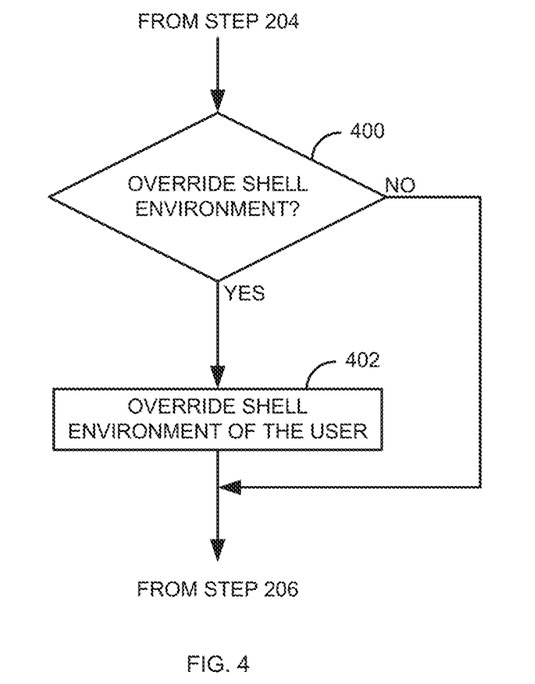
FIG. 4 is a flow diagram of a process for overriding a shell environment of a host.

FIG. 2 is a flow diagram of a process for managing host hoping. Illustratively, the communication devices 101A-101N, the access gateway 120, the connection manager 121, the security module 122, the policy manager 123, the administrative terminal 124, the hosts 130A-130N, and the monitoring process 131A are stored-program-controlled entities, such as a computer or processor, which performs the method of FIGS. 2-4 and the processes described herein by executing program instructions stored in a non-transitory computer readable storage medium, such as a memory or disk. Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The processes of FIGS. 2-4 are described based on a communication session being established from the communication device 101A to the host 130A. However, processes of FIGS. 2-4 will work for any communication session (including simultaneous communication sessions) between any of the communication devices 101A-101N to any of the hosts 130A-130N. The process starts in step 200. The connection manager 121 determines, in step 202, if a request from the communication device 101A is received to establish a communication session with the host 130A. If the request is not received in step 202, the process repeats step 202.

Otherwise, if the request from the communication device 101A is received to establish a communication session with a host 130A, the connection manager 121 establishes the communication session between the communication device 101A and the host 130A in step 204. In this embodiment, the access gateway 120 is acting as a "man in the middle" device. Because the access gateway 120 is in the middle of the communication session, the security module 122 can monitor the communication session.

The security module 122 monitors the communication session for a command(s) in step 206. The command(s) can be any command, such as defined commands, shell commands, user defined commands (e.g., as defined in a macro), and/or the like. One example is where the user opens a command line terminal in Linux™ (or Unix®) to execute commands in the command line terminal. From the command line terminal, a user at the communication device 101A can initiate various commands. When the command is monitored, the security module 122 does not have to know any specifics of what the command is being used for. The command may be simple command, such as the Linux™ "ls" command (directory listing command that is a non security breach), a "vi" command (to open the vi editor, also a non-security breach), or a command that opens a connection to another host 130B-130, which causes a security breach. Examples of commands that can create a communication session to anther host 130 can be, but are not limited to, a Secure SHell command (ssh), a telnet command (telnet), a file transfer protocol command (ftp), a secure copy command (scp), and the like. The user (e.g., a hacker) may create a custom command that can cause a security breach using a shell script or macro. For example, the user may define a command (e.g., a macro named "test"), that executes a shell script that uses the ssh command to open a communication session to the host 130B.

The security module 122 monitors the communication session in step 206 for a command. If a command is not detected in step 206, the connection manager 121 determines if the communication session has ended in step 214. If the communication session has ended in step 214, the process goes back to step 202 to see if there is a new request to establish a communication session from a communication device 101 to a host 130. Otherwise, if the communication session has not ended in step 214, the process goes back to step 206.

If the security module 122 detects a command in step 206, the security module 122 receives information about an effect of the command on the host 130A. For example, if the command was a ssh command to open a communication session to host 130N, the information about the effect of the command on the host 130A can indicate the activation (or attempt to activate) of an outbound port on the host 130A to the host 130N. Alternatively, if the command was a scp (secure copy) command, the information about the effect of the command can indicate that a file is ready to be copied, being copied, or was copied (depending on implementation) from the host 130N to the host 130A (or visa versa).

The information of step 208 can be received via different methods based on the specific implementation. For example, the information may be automatically sent from the monitoring process 131 when the user issues the command. In this embodiment, the monitoring process 131 is a thread or daemon that sends the information whenever a command is issued. The monitoring process 131 can be a thread/daemon that can be configured on each of the hosts 130A-130N to send the information to the security module 122 to identify security breaches. Alternatively, the received information of step 208 may be received based on one or more commands sent by the security module 122 to get the information (see the description of FIG. 3 for more detail).

If the information of step 208 indicates that a communication session is not is being established to another host 130 in step 210, the process goes back to step 202. Otherwise, if the information of step 208 indicates that a communication session is being established to another host 130 in step 210, the security module 122 generated an action based on one or more policies defined by the policy manager 123. A communication session to the other host 130 can be or include a connection, such as a TCP/IP connection, a Session Initiation Protocol (SIP) connection, an Integrated Services for Digital Network (ISDN) connection, a UDP/IP connection, a file copy, a file transfer, and/or the like.

The action may vary based on various rules defined by the policy manager 123. For example, the rules may be based on whether the user has access rights to the other host 130, based on an enterprise security policy, based on specifics of what the user is trying to do on the other host 130, and/or the like. The action may be to alert an administrator at the administration terminal 124, request the administrator to approve the command at the administrator terminal 124, block any additional commands in the communication session, disconnect the communication session, disconnect the communication session to the other host 130 (e.g., by sending a command to the host 130A), blocking the attempted establishment of the communication session to the other host 130, deleting a copied file, and/or the like. After the action is completed in step 212, the process goes back to step 202.

FIG. 3 is a flow diagram of a process for establishing a communication session between an access gateway 120 and a host 130 for managing host hopping. The process of FIG. 3 goes between steps 204 and 208 of FIG. 2. After establishing the communication session in step 204, the security module 122 can optionally capture the credentials of the user of the communication session in step 300. The credentials can be determined in various ways. In one embodiment, the security module 122 uses the login credentials (e.g., user name and password) of the user when logging into the host 130. Alternatively, the credentials may be stored in the access gateway 120 or in a database where step 300 is not implemented.

The connection manager 121 establishes a communication session from the access gateway 120 to the host 130A using the user's credentials in step 302. Alternatively, instead of determining the user's credentials in step 300, the security module 122 can use its own credentials (e.g., administered credentials) to establish a communication session with the host 130A. The security module 122 monitors the communication session between the communication device 101A and the host 130A. If a command is not found in step 206, the process goes to step 214. Otherwise, if the command is found in step 206, the security module 122 sends, in step 304, one or more commands from the access gateway 120 to the host 130A to determine the effect produced by the command of step 206. The command can be a command line command as described in FIG. 2. Examples of commands that can be used to get the status information can be, but are not limited to the Linux™ netstat command (which displayed all the opened ports), the Linux™ lsof command (that lists all the open files for all active processes), the Linux™ ps command (that list all active processes), the Linux™ pstree command (that list of processes in a tree), the Linux™ top command (that lists processor activity), and/or the like. The process goes to step 208 where the security module 122 receives the information about the effect of the command on the host 130A.

To illustrate the processes of FIGS. 2-3, consider the following example. The user of the communication device 101B initiates a communication session to the host 130B. The connection manager 121 receives the request in step 202 and establishes a first communication session between the user at the communication device 101B and the host 130B in step 204. The user provides the user name and password to login to the host 130B. The security module 122 captures the user's credentials in step 300. The user is then logged into the host 130B. Using the captured credentials, the security module 122 establishes a second communication session from the security module 122 to the host 130B in step 302. The security module 122 monitors the first communication session for a command in step 206.

The user opens up a command line terminal to the host 130B. The user enters the ssh command to establish a communication with the host 130N. When the ssh command is received in step 206, the security module 122 sends a lsof -a -i: ssh -u <user>|grep -v "sshd" command in the second communication channel. The process ID from the lsof command is captured by the security module 122. The security module 122 then sends a ps -p<PID> -o etime command using the process ID captured from the lsof command in the second communication channel to the host 130B in step 304. The ps command determines how long the process has been running. This allows the security module 122 to determine if there are any newly opened ports. In this embodiment, the lsof/ps commands indicate an outbound connection has been established to the host 130N by the user. The host 130B sends information indicating the effect of the ssh command that shows that a TCP/IP port was opened to the host 130N, which is received by the security module 122 in step 208. The security module 122 determines that the ssh command opened a communication session to the host 130N in step 210. Based on the policy manager's rules, the connection manager 121 disconnects the first communication session because the user does not have rights to access the host 130N. Thus, a security breach has been prevented.

The effect produced by the command of step 206 can be determined in other ways than those described above. For example, the security module 122 can send an initial netstat command to the host 130 when the communication session is established in step 204 to get a snap-shot of what ports are currently active. This can be compared to a netstat command sent in step 304 to determine if there have been outgoing ports activated. Alternatively, the security module 122 can periodically poll the host 130 to see if there is a change that occurs after the command is received in step 206.

In another embodiment, the command sent in step 304 may comprise three or more commands. Alternatively, the process may use a custom command that provides the information necessary. In addition to looking at open ports, the command sent in step 304 may get information regarding open files (on the other host 130), active processes, processing activity, and/or the like.

In some embodiments, the policy manager 123 may require that the administrator approve every command that is detected in step 206, regardless of what the command is. If the administrator does not approve the command in step 206, the security module 122 does not allow the command to be sent to the host 130.

FIG. 4 is a flow diagram of a process for overriding a shell environment of a host 130. The flow diagram of FIG. 4 goes between steps 204 and 206 of FIG. 2. After establishing the communication session from the communication device 101 to the host 130 in step 204 the security module 122 determines in step 400 if the policy manager 123 has defined that the user's shell environment be overridden in step 400. The users shell environment may have parameters that allow the user to create short cut keys or other commands that may circumvent security. By overriding the user's shell environment with a defined shell environment that is more secure, the system can further prevent security breaches.

If the policy manager's 123 rules specify to not override the user's shell environment, the process goes to step 206. Otherwise, if the policy manager's 123 rules specify to override the user's shell environment the security module 122 overrides the shell environment of the user in step 402 and the process goes to step 206.

For example, the security module 122 can override the user's shell environment by setting the shell environment to /bin/bash or /bin/sh to define a specific type of shell. The security module 122 can send a unalias—a command to remove any aliases for the current shell. The security module 122 can send a set command to set or remove any environment variables that may cause security issues. The overriding of the shell environment can prevent the user from viewing a history on the first host 130, using a short-cut key, using a macro, and/or the like.

Figure 5:
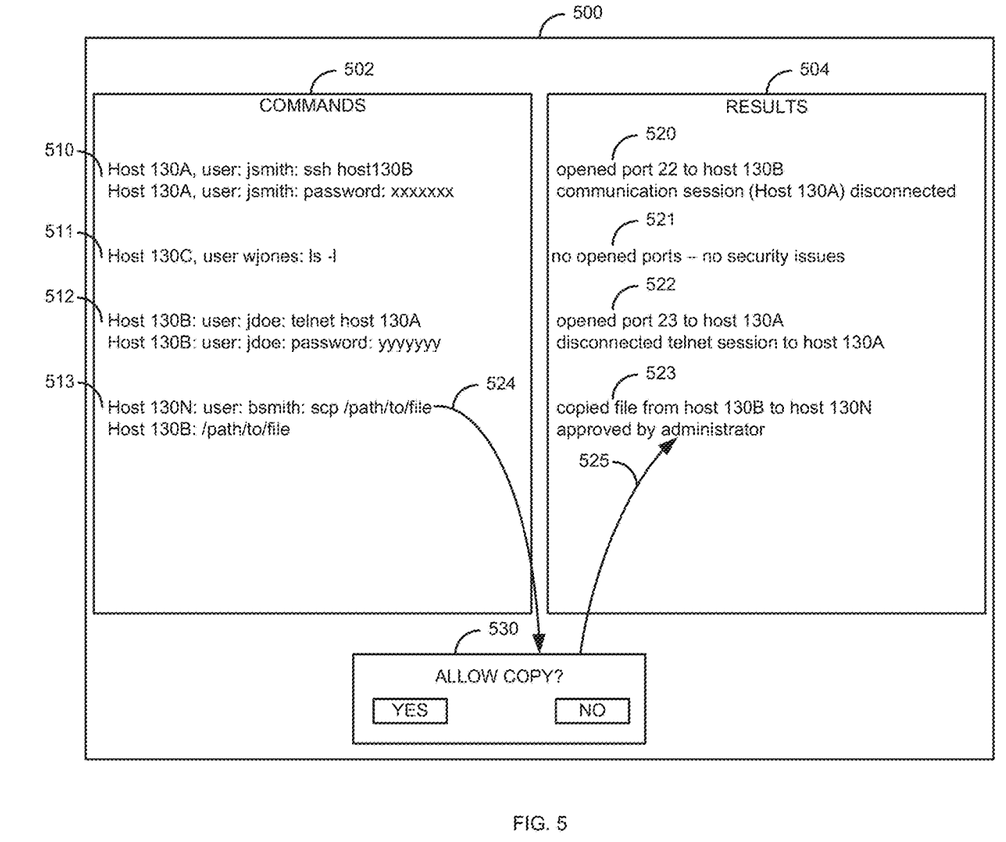
FIG. 5 is a diagram of an administrative display for managing host hopping.

FIG. 5 is a diagram of a display 500 for managing host hopping. FIG. 5 is an illustrative display 500 that is displayed to an administrator in the administrative terminal 124. The display 500 includes a command window 502, a results window 504, and an allow copy window 530. When the commands are received in step 206, the security module 122 captures the commands and sends the commands to the administrative terminal 124 (in the command window 502) and/or to a log file. When the information about the effect of the command on the host 130 is received in step 208, the security module 122 organizes the information and sends the information to the results window 504. The administrator can then view the information to determine if there are any potential security breaches.

FIG. 5 shown four entries 510-513 for commands that different users on different hosts 130 have requested. The effect of the commands on the host 130A-130N is shown the in the results window 502 in entries 520-523. Entry 510 shows that the user (jsmith) has initiated a ssh command from the host 130A to establish a communication session to the host 130B. The result of the ssh command in entry 520 shows that port 22 (a ssh port) was opened to the host 130B. The action resulting from the ssh command in entry 520 shows that the communication session to the host 130A was disconnected.

Entry 511 shows that the user wjones on host 130C initiated a ls -l (a file listing command). The result of the ls -l command is that no ports were opened with no security issues.

Entry 512 shows that the user jdoe initiated a telnet command on host 130B to establish a telnet connection to host 130A. The result of the telnet command in entry 522 shows that port 23 (a telnet port) was opened to host 130A. The action resulting from the telnet command is that the telnet session to host 130A was disconnected.

Entry 513 shows that the user bsmith on host 130N attempted to do a secure copy from the host 130B to the host 130N. As a result, the allow copy window 530 is displayed to the administrator in step 524. The administrator approved the copy in step 525 resulting in entry 523. Entry 523 shows that the file was copied from host 130B to host 130N. Entry 523 also shows that the copy was approved by the administrator.

FIG. 5 is an illustrative example of some of the ways that different commands can be handled. One of skill in the art would recognize that different combinations of all the descriptions described above would also be possible.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   monitoring, by a microprocessor in an access gateway, a first communication session between a communication device and a first host device for a first command;
   establishing, by the microprocessor in the access gateway, a second communication session between the access gateway and the first host device;
   in response to receiving the first command, sending, by the microprocessor in the access gateway, one or more commands, in the second communication session, to determine an effect produced by the first command on the first host device and receiving, from the first host device, information about the effect produced by the first command on the first host device;
   determining, by the microprocessor in the access gateway, if the effect results in an attempted establishment and/or an establishment of a third communication session between the first host device and a second host device; and
   in response to determining that the effect results in the attempted establishment and/or establishment of the third communication session between the first host device and the second host device, generating, by the microprocessor in the access gateway, an action.

2. The method of claim 1, wherein the effect produced by the first command is at least one of the following:
   an activation of an outbound port on the first host device;
   copying of a file from the first host device to the second host device; or
   copying of a file from the second host device to the first host device.

3. The method of claim 1, wherein the action is at least one of:
   alerting an administrator;
   requesting the administrator approve the first command;
   deleting a copied file;
   blocking any additional commands in the first communication session;
   disconnecting the first communication session;
   disconnecting the third communication session; or
   blocking the attempted establishment of the third communication session.

4. The method of claim 1, further comprising:
   in response to receiving the first command, requesting an administrator to approve the first command.

5. The method of claim 1, wherein the first command is at least one of a Secure SHell (SSH) command, a telnet command, a file transfer protocol command, and a secure copy command.

6. The method of claim 1, wherein the first communication session is with a user of the communication device and further comprising:
   establishing the first communication session; and
   in response to establishing the first communication session with the user, overriding a shell environment of the user for a defined shell environment.

7. The method of claim 6, wherein the defined shell environment does at least one of:
   not allow the user of the communication device to view a history on the first host device;
   not allow the user of the communication device to use a short-cut key;

not allow the user of the communication device to use an alias; or not allow the user of the communication device to use a macro.

8. The method of claim 1, wherein the information about the effect produced by the first command is automatically sent from the first host device based a process running on the first host device.

9. An access gateway comprising:
a microprocessor; and
a computer readable medium, coupled with the microprocessor and comprising microprocessor readable and executable instructions that cause the microprocessor to execute:
a security module that monitors a first communication session between a communication device and a first host device for a first command, sends one or more commands, in a second communication session, to determine an effect produced by the first command on the first host device and receives, from the first host device, information about the effect produced by the first command on the first host device in response to receiving the first command, determines if the effect results in an attempted establishment and/or an establishment of a third communication session between the first host device and a second host device, and generates an action in response to determining that the effect results in the attempted establishment and/or establishment of the third communication session between the first host device and the second host device; and
a connection manager that establishes the second communication session between the access gateway and the first host device.

10. The access gateway of claim 9, wherein the effect produced by the first command is at least one of the following:
an activation of an outbound port on the first host device;
copying of a file from the first host device to the second host device; or
copying of a file from the second host device to the first host device.

11. The access gateway of claim 9, wherein:
the security module captures login credentials of a user of the first communication session; and
the connection manager that establishes the second communication session between the access gateway and the first host device using the login credentials of the user.

12. The access gateway of claim 9, wherein the action is at least one of:
alerting an administrator;
requesting the administrator approve the first command;
deleting a copied file;
blocking any additional commands in the first communication session;
disconnecting the first communication session;
disconnecting the third communication session; or
blocking the attempted establishment of the third communication session.

13. The access gateway of claim 9, wherein the security module requests an administrator to approve the first command in response to receiving the first command.

14. The access gateway of claim 9, wherein the first communication session is with a user of the communication device and wherein a connection manager establishes the first communication session and wherein the security module overrides a shell environment of the user for a defined shell environment in response to establishing the first communication session with the user.

15. The access gateway of claim 14, wherein the defined shell environment does at least one of:
not allow the user of the communication device to view a history on the first host device;
not allow the user of the communication device to use a short-cut key;
not allow the user of the communication device to use an alias; or
not allow the user of the communication device to use a macro.

16. A method comprising:
monitoring, by a microprocessor in an access gateway, a first communication session between a communication device and a first host device for a first command;
capturing, by the microprocessor in an access gateway, login credentials of a user of the first communication session;
establishing, by the microprocessor in an access gateway, a second communication session between the access gateway and the first host device using the login credentials of the user;
in response to receiving the first command, sending, by the microprocessor in an access gateway, a one or more commands to the first host device in the second communication session to determine the effect produced by the first command and receiving, from the first host device, information about the effect produced by the first command on the first host device;
determining, by the microprocessor in an access gateway, if the effect results in an attempted establishment and/or an establishment of a third communication session between the first host device and a second host device; and
in response to determining that the effect results in the attempted establishment and/or establishment of the third communication session between the first host device and the second host device, generating, by the microprocessor in an access gateway, an action.

17. The method of claim 16, further comprising:
displaying the first command in a first window to an administrator; and
displaying the information about the effect produced by the first command on the first host device in a second window to the administrator.

18. The method of claim 16, wherein the effect produced by the first command is at least one of the following:
an activation of an outbound port on the first host device;
copying of a file from the first host device to the second host device; or
copying of a file from the second host device to the first host device.

19. The method of claim 16, wherein the action is at least one of:
alerting an administrator;
requesting the administrator approve the first command;
deleting a copied file;
blocking any additional commands in the first communication session;
disconnecting the first communication session;
disconnecting the third communication session; or
blocking the attempted establishment of the third communication session.

20. The method of claim 16, wherein the first communication session is with the user of the communication device and further comprising:

establishing the first communication session; and
in response to establishing the first communication session with the user, overriding a shell environment of the user for a defined shell environment.

* * * * *